Sept. 28, 1937.　　　　　L. DE FLOREZ　　　　　2,094,002
BINAURAL FLYING
Filed April 2, 1936
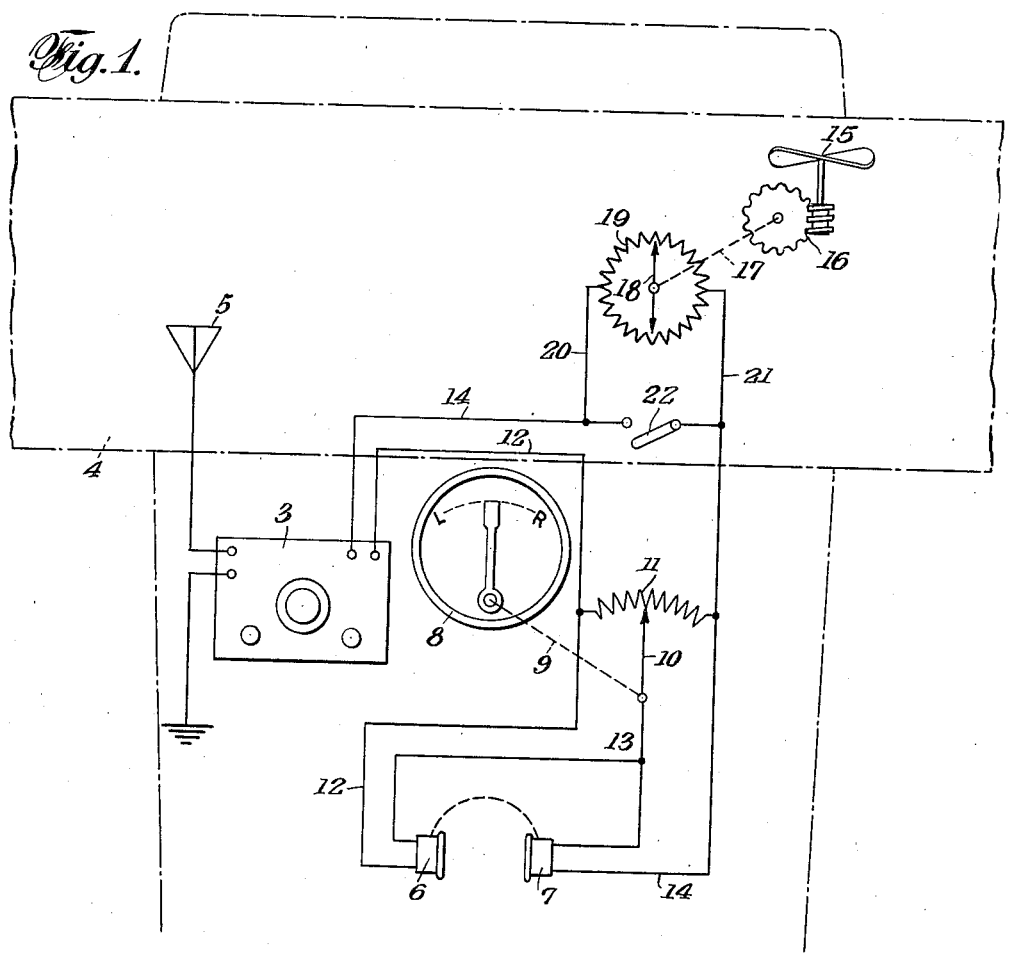
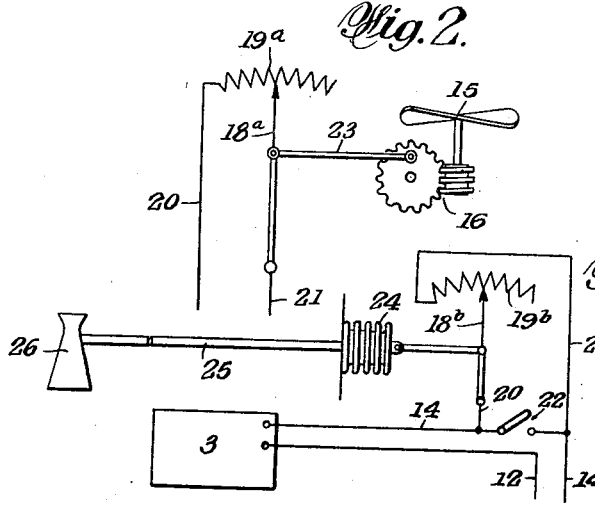
LUIS DE FLOREZ
INVENTOR
BY
ATTORNEY Patented Sept. 28, 1937

2,094,002

UNITED STATES PATENT OFFICE 2,094,002

BINAURAL FLYING

Luis de Florez, New York, N. Y., assignor to National Aviation Research Corporation, New York, N. Y., a corporation of Delaware Application April 2, 1936, Serial No. 72,237

7 Claims. (Cl. 177—311)

This invention relates to the flying of aircraft by utilizing the natural sense of direction and location provided by the binaural faculty.

Important objects of the present invention are to furnish simple, inexpensive and practical equipment for providing the pilot of an aircraft with a reference point of sound as a guide for directing the craft about one axis of movement and in addition with a modifying signal which will indicate attitude of the craft in respect to another axis.

A further special object is to furnish these signal indications in a manner which will be readily intelligible and which will not be tiring to the pilot.

Particular objects are to furnish a turn signal by which the pilot may readily steer the craft and to modify that signal with changes in pitch or inclination, so that the pilot will be instantly informed and can more or less automatically correct for changes in diving or climbing attitudes.

Further objects and the novel features of construction, combinations and relations of parts by which the objects are attained are set forth and will appear in the course of the following specification.

The drawing accompanying and forming part of the specification illustrates certain practical embodiments of the invention, but it will be appreciated that the actual physical structure may be modified and changed in various ways all within the true spirit and broad scope of the invention.

Fig. 1 of the drawing is a diagrammatic representation of an embodiment of the invention as applied to an airplane.

Figs. 2 and 3 are diagrammatic views of modified forms of the signal modulating device.

In Figure 1, the signal source is a radio receiver indicated at 3, suitably mounted on the airplane represented at 4, and shown as equipped with a non-directional antenna or pickup 5.

The signal output of the radio receiver is transmitted to binaural receivers 6, 7, under the control of a turn indicator 8, operating through connections 9, the switch arm 10, over a variable resistance 11, to cut in more signal in one ear, while taking away signal from the other ear, in accordance with deviation from straight flight.

The electrical connections for accomplishing these results are indicated as one lead 12, extending from the radio receiver to the left hand binaural receiver, a common connection 13, from the two receivers to the switch arm 10, and a second lead 14, from the radio receiver to the other, right hand binaural receiver 7. The potentiometer resistance 11, is shown directly connected across the two leads 12, 14.

With the construction described, a broadcasting station may be tuned in on the radio receiver with the machine in the desired direction of flight and then with any deviation from that direction of flight, the fact will be immediately made known to the pilot by the increase in signal in one ear with consequent decrease of signal in the other ear, automatically effected by the turn indicator. Thus the pilot may steer by ear and be free to watch the engine and other instruments, as required.

To furnish an indication of the fore and aft attitude of the craft, there is provided in the present disclosure a small wind driven propeller 15, located to be properly driven according to relative air speed of the craft and operating through a worm gearing 16, and shaft connections 17, a short circuiting switch arm 18, travelling over a circular resistance 19, connected by wiring 20, 21, in the output circuit of the radio receiver.

In the present diagram, one side 14 of the radio output is shown interrupted by a switch 22, and the modulating resistance 19, is shown bridged across this switch by the connections 20, 21.

With the switch 22 open as indicated, the modulating resistance 19 will be connected in series with the binaural signal receivers and consequently the signal, whether it be transmitted equally to both binaural receivers as in straight flight, or more to one receiver than the other, or entirely to one receiver and not the other, will be modulated in recurrent waves, depending for their frequency upon the relative air speed of the craft. With the double arm switch bar 18, in the intermediate position shown, the signal will be weakest, with all the bridging resistance in circuit and as this signal bar rotates toward and finally lines up with the terminals of wiring 20, 21 the resistance will be gradually and finally entirely short-circuited, building up the signal strength to a maximum. The gearing and resistance are such preferably that at normal air speed the signal will be modulated in recurrent waves of sufficient frequency to be readily and more or less automatically recognized by the pilot, without fatigue. Variations from this normal rate, that is, a slowing down with a climbing angle and a speeding up with a diving angle are readily recognized after even slight familiarity with the normal flying rate. This modulation of the signal in gradually increasing and decreasing waves of intensity is less tiring than more abrupt on and off changes or superimposed signals and does not destroy the sequence of the received matter, so that the pilot may follow a broadcast for example, while using that same subject to give both a sound reference for direction of flight and a signal indication for angle of flight.

The apparatus is relatively simple and inexpensive and may readily be applied to existing equipment.

The specific structure employed may be modified in various ways. Thus as indicated in Fig. 2, the wave form of amplification may be effected by a simple oscillating switch member 18a, swung back and forth over the resistance 19a, by a crank connection 23, from the wind driven worm gear. The switch at 22 provides a convenient means for rendering the periodic modulating means operative or inoperative, so that the pilot may use this pitch indication as an aid for maintaining safe flight and when desired, may cut out the modulation, for instance, to hear the broadcast signal undisturbed and full strength. The simple forms of modulations shown are inexpensive and entirely practical, but it will be realized that other forms of modulating devices may be employed and that if desired, the character of modulation may be varied from the simple periodic wave type illustrated. The "beat note" effect accomplished by periodically varying the intensity of the signal provides a readily recognized indication which does not tire the aural sense. After short practice, the timing incident to normal flight is readily recognized and remembered and any variation from such timing is instantly noticed.

In place of modulation to produce the beat note effect, the signal may be simply varied in intensity in accordance with air speed, as by operating an intensity controlling resistance 18b, 19b, Fig. 3 from a sylphon bellows 24, subjected to suction through tubing 25, connected with a venturi 26, located in some more or less undisturbed portion of the slip stream of the craft.

What is claimed is:

1. In combination with aircraft, binaural receivers, a signal source, a turn indicator, means operable thereby for directing signal energy from said signal source to said binaural receivers in accordance with variations in turn and means for periodically modulating said signals in accordance with relative air speed of the craft.

2. Binaural flight apparatus, comprising in combination, binaural receivers, means for selectively actuating said binaural receivers in accordance with turning movements and means for periodically modulating the actuation of said binaural receivers in accordance with air speed.

3. The herein disclosed method for aiding aircraft flight, which comprises creating an audible signal and periodically modulating the same at a frequency varying with relative air speed of the craft.

4. The herein disclosed method for aiding aircraft flight, which comprises creating binaural signals, varying the effect of one binaural signal with respect to the other in accordance with deviation from a predetermined flight attitude and periodically modulating such signals at a frequency varying with relative air speed of the craft.

5. The herein disclosed method for aiding aircraft flight, which comprises creating an audible signal and periodically altering the intensity of the same at a frequency varying with relative air speed of the craft.

6. Apparatus of the character disclosed, comprising in combination, a radio receiver, air speed controlled means for periodically modulating the output of said receiver.

7. In combination with aircraft, binaural receivers on said aircraft, a radio receiver on said aircraft, a turn indicator on said aircraft, means operable by said turn indicator for directing signal energy from said radio receiver to said binaural receivers in accordance with direction of turn of said aircraft and air speed controlled means for periodically modifying said signals in accordance with relative air speed of said aircraft.

LUIS DE FLOREZ.